US010416902B2

(12) United States Patent
Wu

(10) Patent No.: US 10,416,902 B2
(45) Date of Patent: Sep. 17, 2019

(54) MEMORY MANAGEMENT METHOD FOR GROUPING PHYSICAL ERASING UNITS TO REGION CORRESPONDING TO PROGRAMMING MODE, AND MEMORY CONTROL CIRCUIT UNIT AND MEMORY STORAGE DEVICE USING THE METHOD

(71) Applicant: PHISON ELECTRONICS CORP., Miaoli (TW)

(72) Inventor: Hsueh-Yuan Wu, Kaohsiung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/091,583

(22) Filed: Apr. 6, 2016

(65) Prior Publication Data
US 2017/0228172 A1    Aug. 10, 2017

(30) Foreign Application Priority Data

Feb. 5, 2016    (TW) .............................. 105104061 A

(51) Int. Cl.
*G06F 12/02*    (2006.01)
*G06F 3/06*    (2006.01)

(52) U.S. Cl.
CPC ............ *G06F 3/0616* (2013.01); *G06F 3/064* (2013.01); *G06F 3/0679* (2013.01); *G06F 12/0246* (2013.01); *G06F 2212/1036* (2013.01); *G06F 2212/214* (2013.01); *G06F 2212/7201* (2013.01); *G06F 2212/7206* (2013.01); *G06F 2212/7211* (2013.01)

(58) Field of Classification Search
CPC .. G06F 3/0616; G06F 12/0246; G06F 3/0679; G06F 3/0665; G06F 3/0659; G06F 3/0644; G06F 2212/7206; G06F 2212/7201; G06F 2212/214; G06F 2212/152; G06F 2212/7211; G06F 2212/1036
See application file for complete search history.

(56) References Cited

U.S. PATENT DOCUMENTS

| 8,429,340 | B2 * | 4/2013 | Tanaka ................ G06F 12/0246 711/103 |
| 2007/0260811 | A1 * | 11/2007 | Merry, Jr. ........... G06F 12/0246 711/103 |
| 2008/0256287 | A1 * | 10/2008 | Lee ..................... G06F 12/0246 711/103 |

(Continued)

*Primary Examiner* — Tasnima Matin
(74) *Attorney, Agent, or Firm* — JCIPRNET

(57) ABSTRACT

A memory management method, a memory storage device and a memory control circuit unit are provided. The method includes: determining whether a relative relation between a first wear value of first physical erasing units initially configured to be programmed based on a first programming mode and a second wear value of second physical erasing units initially configured to be programmed based on a second programming mode is satisfied; and when the relative relation between the first wear value and the second wear value is not satisfied, selecting one or more third physical erasing units from second physical erasing units. The method also includes: programming the one or more third physical erasing units based on the first programming mode to store first data received from a host system into the one or more third physical erasing units.

33 Claims, 9 Drawing Sheets

(56) References Cited

U.S. PATENT DOCUMENTS

| | | | |
|---|---|---|---|
| 2008/0276038 A1* | 11/2008 | Tanaka | G06F 12/0246 |
| | | | 711/103 |
| 2009/0044085 A1* | 2/2009 | Zeng | G11C 16/3404 |
| | | | 714/799 |
| 2009/0327590 A1* | 12/2009 | Moshayedi | G06F 11/1441 |
| | | | 711/103 |
| 2010/0174852 A1* | 7/2010 | Chien | G06F 12/0246 |
| | | | 711/103 |
| 2011/0197014 A1* | 8/2011 | Yeh | G06F 12/0246 |
| | | | 711/103 |
| 2013/0138870 A1* | 5/2013 | Yoon | G11C 11/5621 |
| | | | 711/103 |
| 2014/0082259 A1* | 3/2014 | Yeh | G06F 12/0246 |
| | | | 711/103 |
| 2014/0245109 A1* | 8/2014 | Yim | G06F 12/0246 |
| | | | 714/773 |
| 2015/0095546 A1* | 4/2015 | Bennett | G06F 12/0246 |
| | | | 711/5 |

* cited by examiner

MEMORY MANAGEMENT METHOD FOR GROUPING PHYSICAL ERASING UNITS TO REGION CORRESPONDING TO PROGRAMMING MODE, AND MEMORY CONTROL CIRCUIT UNIT AND MEMORY STORAGE DEVICE USING THE METHOD

CROSS-REFERENCE TO RELATED APPLICATION

This application claims the priority benefit of Taiwan application serial no. 105104061, filed on Feb. 5, 2016. The entirety of the above-mentioned patent application is hereby incorporated by reference herein and made a part of this specification.

BACKGROUND OF THE INVENTION

Technology Field

The present invention relates to a memory management method and particularly relates to a memory management method for a rewritable non-volatile memory module, a memory control circuit unit and a memory storage device using the method.

Description of Related Art

The growth of digital cameras, mobile phones, and MP3 players has been rapid in recent years, resulting in escalated demand for storage media by consumers. A rewritable non-volatile memory has characteristics, such as data non-volatility, low power consumption, compact size, no mechanical structure, and fast reading/writing speed, and thus is particularly ideal for portable electronic products, e.g. laptop computer. A solid state drive is a memory storage device that adopts a flash memory as the storage medium. Therefore, the flash memory industry has become popular among the electronic industries.

Generally, NAND flash memories may be classified into Single Level Cell (SLC) NAND flash memories, Multi Level Cell (MLC) NAND flash memories, and Trinary Level Cell (TLC) NAND flash memories according to the number of bits that each memory cell is capable of storing. Specifically, each memory cell of a SLC NAND flash memory is capable of storing 1 bit of data (i.e. "1" and "0"), each memory cell of a MLC NAND flash memory is capable of storing 2 bits of data (i.e. "11", "10", "01", and "00"), and each memory cell of a TLC NAND flash memory is capable of storing 3 bits of data (i.e. "111", "110", "101", "100", "011", "010", "001", and "000"). Take SLC NAND flash memory and MLC NAND flash memory for example, the SLC NAND flash memory uses a set of high and low voltages to distinguish two charge values (i.e. "1" and "0") while the MLC NAND flash memory is driven by higher voltages and records 2 bits of data through voltages of different levels. Therefore, the data recording density of the MLC NAND flash memory is twice as much as that of the SLC NAND flash memory.

In addition, the SLC NAND flash memory has a simpler structure and less voltage variation when writing data, and therefore has longer lifetime. In order to increase the recording space, the MLC NAND flash memory has a smaller voltage range and the voltage varies more frequently during writing of data, and therefore more space for Cyclic Redundancy Check (CRC) is required. Consequently, the MLC NAND flash memory can provide about 10,000 times of reading and writing only, which is far less than the 100,000 times of the SLC NAND flash memory. In brief, SLC NAND flash memory has advantages in lifetime and performance but is low in capacity and expensive to produce, and MLC NAND flash memory offers larger capacity but is inherently deficient in speed and lifetime. In order to efficiently lower the production costs without affecting the performance of the flash memory, the current method is to dispose two different regions (SLC and MLC (or TLC)) in the rewritable non-volatile memory, and use the faster SLC region to record important and frequently-accessed data and management tables and use the low-cost MLC region to record general file data, so as to satisfy both the requirements of low cost and high performance.

Since the SLC region and the MLC region are used differently, they have different wear degrees. For a memory storage device that is frequently powered off, it is required to update data and rebuild tables from time to time, which will increase wear degree of the SLC region. On the other hand, for a memory storage device that often writes a large amount of random data, the wear degree of the MLC region will increase more easily. Accordingly, when one of the regions can no longer be used, it means the memory storage device is dead, and when one of the regions is seriously worn, the overall lifetime of the memory storage device becomes much shorter. The conventional way of managing a rewritable non-volatile memory is to use only the SLC region to record the important and frequently-accessed data and tables, for this reason, in order to ensure that the SLC region storing these specific data and tables has sufficient space for use, a sufficient space is reserved in advance for the SLC region, but it will cause the MLC region (or TLC region) to be compressed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a memory management method, a memory control circuit unit, and a memory storage device for improving decrease of the overall lifetime of the memory storage device resulting from different wear degrees of a SLC region and a MLC region.

An exemplary embodiment of the invention provides a memory management method for a rewritable non-volatile memory module which includes a plurality of physical erasing units including a plurality of first physical erasing units and a plurality of second physical erasing units. The first physical erasing units are configured to be programmed based on a first programming mode and the second physical erasing units are initially configured to be programmed based on a second programming mode. The memory management method includes: receiving first data from a host system, wherein the first data is to be stored into at least a first logical unit; determining whether a first wear value of the first physical erasing units and a second wear value of the second physical erasing units satisfy a relative relation; selecting at least a third physical erasing unit from the second physical erasing units if the first wear value and the second wear value do not satisfy the relative relation; and programming the one or more third physical erasing units based on the first programming mode to store the first data into the one or more third physical erasing units, and mapping the at least one first logical unit to the one or more third physical erasing units.

Another exemplary embodiment of the invention provides a memory control circuit unit configured to control a rewritable non-volatile memory module which includes a plurality of physical erasing units including a plurality of first physical erasing units and a plurality of second physical erasing units. The first physical erasing units are configured to be programmed based on a first programming mode and the second physical erasing units are initially configured to be programmed based on a second programming mode. The memory control circuit unit includes a host interface, a memory interface, and a memory management circuit. The host interface is coupled to a host system. The memory interface is coupled to the rewritable non-volatile memory module. The memory management circuit is coupled to the host interface and the memory interface. The memory management circuit is configured to receive first data from the host system, and the first data is to be stored into at least a first logical unit. The memory management circuit is further configured to determine whether a first wear value of the first physical erasing units and a second wear value of the second physical erasing units satisfy a relative relation. The memory management circuit is further configured to select at least a third physical erasing unit from the second physical erasing units if determining that the first wear value and the second wear value do not satisfy the relative relation. The memory management circuit is further configured to transmit a first writing command sequence to instruct to program the one or more third physical erasing units based on the first programming mode to store the first data into the one or more third physical erasing units and map the at least one first logical unit to the one or more third physical erasing units.

Another exemplary embodiment of the invention provides a memory storage device, which includes a connection interface unit, a rewritable non-volatile memory module, and a memory control circuit unit. The connection interface unit is coupled to a host system. The rewritable non-volatile memory module includes a plurality of physical erasing units which include a plurality of first physical erasing units and a plurality of second physical erasing units. The first physical erasing units are configured to be programmed based on a first programming mode and the second physical erasing units are initially configured to be programmed based on a second programming mode. The memory control circuit unit is coupled to the connection interface unit and the rewritable non-volatile memory module. The memory control circuit unit is configured to receive first data from the host system, and the first data is to be stored into at least a first logical unit. The memory control circuit unit is further configured to determine whether a first wear value of the first physical erasing units and a second wear value of the second physical erasing units satisfy a relative relation. The memory control circuit unit is further configured to select at least a third physical erasing unit from the second physical erasing units if determining that the first wear value and the second wear value do not satisfy the relative relation, and the memory control circuit unit is further configured to transmit a first writing command sequence to instruct to program the one or more third physical erasing units based on the first programming mode to store the first data into the one or more third physical erasing units and map the at least one first logical unit to the one or more third physical erasing units.

Based on the above, in the exemplary embodiments of the invention, the wear degrees of the first physical erasing units and the second physical erasing units are determined according to the erase count of the first physical erasing units configured to be programmed based on the first programming mode and the erase count of the second physical erasing units initially configured to be programmed based on the second programming mode, so as to dynamically decide whether to select physical erasing units from the first physical erasing units or the second physical erasing units to update information that needs to be accessed frequently and tables for management. Moreover, the physical erasing units selected from the first physical erasing units or the second physical erasing units are programmed based on the first programming mode for storing the information that needs to be accessed frequently and the tables for management. Accordingly, the wear of the first physical erasing units and the wear of the second physical erasing units are leveled to efficiently improve decrease of the overall lifetime of the memory storage device resulting from different wear degrees of the SLC region and the MLC region (or TLC region).

To make the aforementioned and other features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
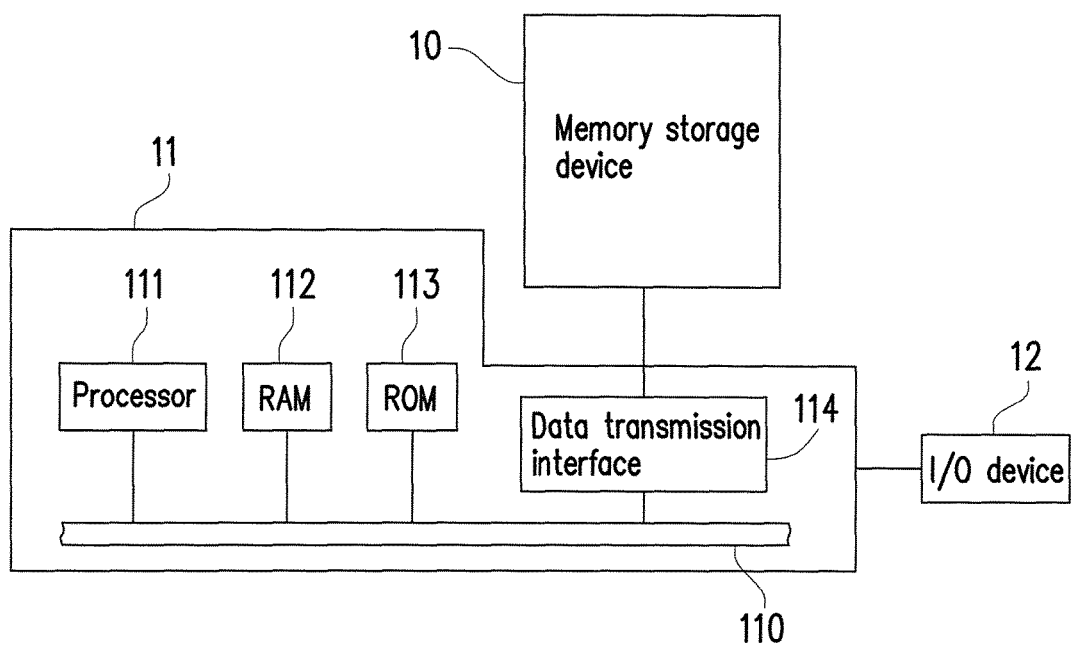
FIG. 1 is a schematic diagram showing the host system, the memory storage device, and the input/output (I/O) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also called a memory storage system) includes a rewritable non-volatile memory module and a controller (also called a control circuit). The memory storage device is usually used together with a host system, such that the host system may write data into or read data from the memory storage device.

Figure 2:
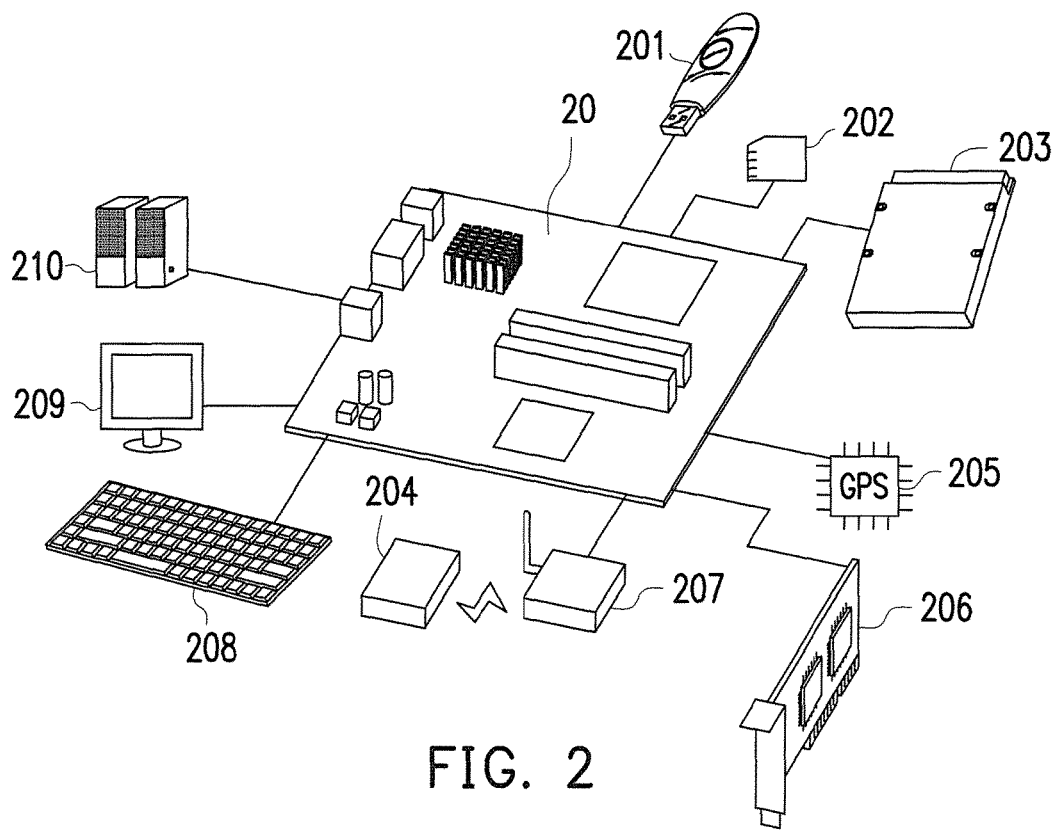
FIG. 2 is a schematic diagram showing the host system, the memory storage device, and the I/O device according to another exemplary embodiment of the invention.

FIG. 1 is a schematic diagram showing the host system, the memory storage device, and an input/output (I/O) device according to an exemplary embodiment of the invention. FIG. 2 is a schematic diagram showing the host system, the memory storage device, and the I/O device according to another exemplary embodiment of the invention.

Referring to FIG. 1 and FIG. 2, a host system 11 includes a processor 111, a random access memory (RAM) 112, a read only memory (ROM) 113, and a data transmission interface 114. The processor 111, the RAM 112, the ROM 113, and the data transmission interface 114 are coupled to a system bus 110.

In this exemplary embodiment, the host system 11 is coupled to a memory storage device 10 through the data transmission interface 114. For example, the host system 11 may write data into or read data from the memory storage device 10 through the data transmission interface 114. In addition, the host system 11 is coupled to an I/O device 12 through the system bus 110. For example, the host system 11 may transmit output signals to or receive input signals from the I/O device 12 through the system bus 110.

In this exemplary embodiment, the processor 111, the RAM 112, the ROM 113, and the data transmission interface 114 may be disposed on a main board 20 of the host system 11. One or more data transmission interfaces 114 may be provided. Through the data transmission interface 114, the main board 20 may be coupled to the memory storage device 10 in a wired or wireless manner. The memory storage device 10 may be a flash drive 201, a memory card 202, a solid state drive (SSD) 203, or a wireless memory storage device 204, for example. The wireless memory storage device 204 may be a memory storage device based on a variety of wireless communication technologies, such as a near field communication (NFC) memory storage device, a wireless fidelity (WiFi) memory storage device, a Bluetooth memory storage device or a Bluetooth low energy (BLE) memory storage device (e.g. iBeacon), and so on. In addition, the main board 20 may be coupled to an I/O device of any kind, such as a global positioning system (GPS) module 205, a network interface card 206, a wireless transmission device 207, a keyboard 208, a monitor 209, a speaker 210, etc., through the system bus 110. For example, in an exemplary embodiment, the main board 20 may access the wireless memory storage device 204 through the wireless transmission device 207.

Figure 3:
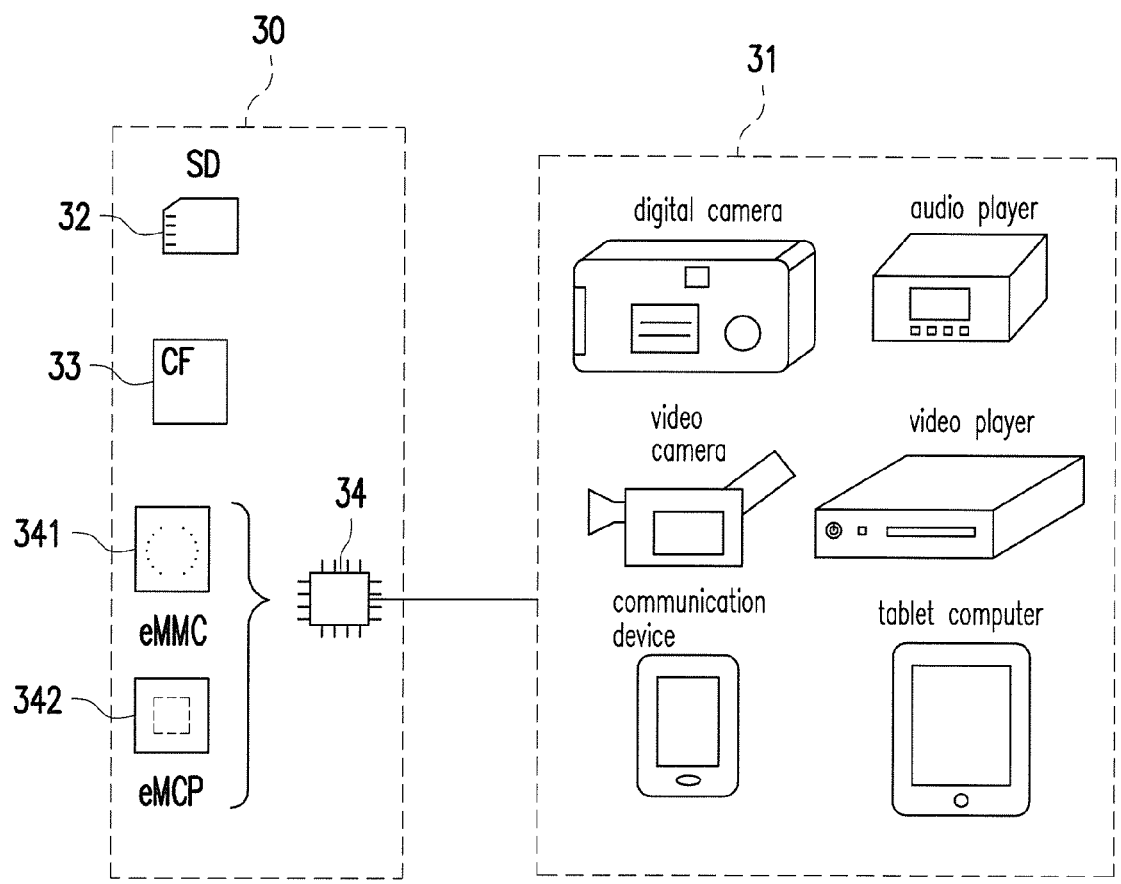
FIG. 3 is a schematic diagram showing the host system and the memory storage device according to another exemplary embodiment of the invention.

In an exemplary embodiment, the aforementioned host system may be any system substantially capable of collaborating with the memory storage device to store data. Even though the host system is described as a computer system in the exemplary embodiment above, FIG. 3 is a schematic diagram showing the host system and the memory storage device according to another exemplary embodiment of the invention. Referring to FIG. 3, in another exemplary embodiment, a host system 31 may also be a system such as a digital camera, a video camera, a communication device, an audio player, a video player, a tablet computer, etc., and a memory storage device 30 may be a non-volatile memory storage device of any kind, such as a secure digital (SD) card 32, a compact flash (CF) card 33, an embedded storage device 34, etc. The embedded storage device 34 includes an embedded storage device of any kind, where a memory module of any kind is directly coupled to a substrate of the host system 31, such as an embedded multimedia card (eMMC) 341 and/or an embedded multi-chip package (eMCP) storage device 342.

Figure 4:
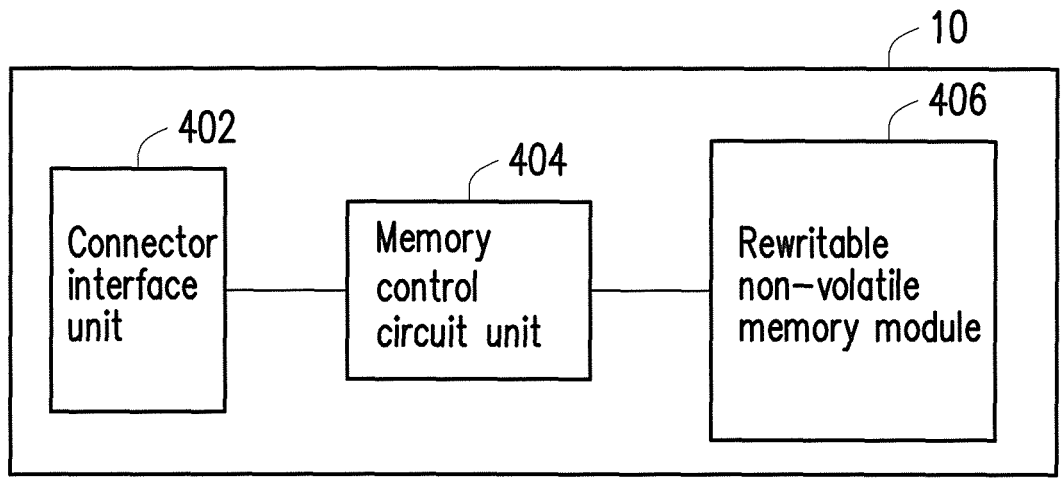
FIG. 4 is a schematic block diagram showing the memory storage device according to an exemplary embodiment of the invention.

FIG. 4 is a schematic block diagram showing the memory storage device according to an exemplary embodiment of the invention.

Referring to FIG. 4, the memory storage device 10 includes a connection interface unit 402, a memory control circuit unit 404, and a rewritable non-volatile memory module 406.

In this exemplary embodiment, the connection interface unit 402 is compatible with the serial advanced technology attachment (SATA) standard. However, it should be understood that the invention is not limited thereto. The connection interface unit 402 may also be compatible with the parallel advanced technology attachment (PATA) standard, the Institute of Electrical and Electronic Engineers (IEEE) 1394 standard, the peripheral component interconnect express (PCI Express) standard, the universal serial bus (USB) standard, the ultra high speed-I (UHS-I) interface standard, the ultra high speed-II (UHS-II) interface standard, the secure digital (SD) interface standard, the memory stick (MS) interface standard, the multi-chip package interface standard, the multimedia card (MMC) interface standard, the embedded multimedia card (eMMC) interface standard, the universal flash storage (UFS) interface standard, the embedded multi-chip package (eMCP) interface standard, the compact flash (CF) interface standard, the integrated device electronics (IDE) interface standard, or other suitable standards. The connection interface unit 402 may be packaged in a chip together with the memory control circuit unit 404, or the connection interface unit 402 may be disposed outside a chip including the memory control circuit unit 404.

The memory control circuit unit 404 is configured to execute a plurality of logical gates or control commands implemented in a hardware form or in a firmware form, and perform various operations, such as data writing, data reading, or data erasing, in the rewritable non-volatile memory module 406 according to a command from the host system 11.

The rewritable non-volatile memory module 406 is coupled to the memory control circuit unit 404 for storing data written by the host system 11. The rewritable non-volatile memory module 406 may be a Single Level Cell (SLC) NAND flash memory module (i.e. a flash memory module capable of storing one bit of data in one memory cell), a Multi Level Cell (MLC) NAND flash memory module (i.e. a flash memory module capable of storing two bits of data in one memory cell), a Triple Level Cell (TLC) NAND flash memory module (i.e. a flash memory module capable of storing three bits of data in one memory cell), other types of flash memory modules, or other memory modules having the same characteristics.

Each memory cell in the rewritable non-volatile memory module 406 stores one or more bits of data by change of a voltage (referred to as a threshold voltage hereinafter). Specifically, a charge trapping layer exists between a control gate of each memory cell and a channel. By applying a writing voltage to the control gate, an electron amount of the charge trapping layer is changed, thereby changing the threshold voltage of the memory cell. The process of changing the threshold voltage is also called "writing data into the memory cell" or "programming the memory cell". Each memory cell of the rewritable non-volatile memory module 406 has a plurality of storage states according to the change of the threshold voltage. The storage state of the memory cell may be determined by applying a reading voltage, thereby obtaining the one or more bits stored by the memory cell.

Figure 5:
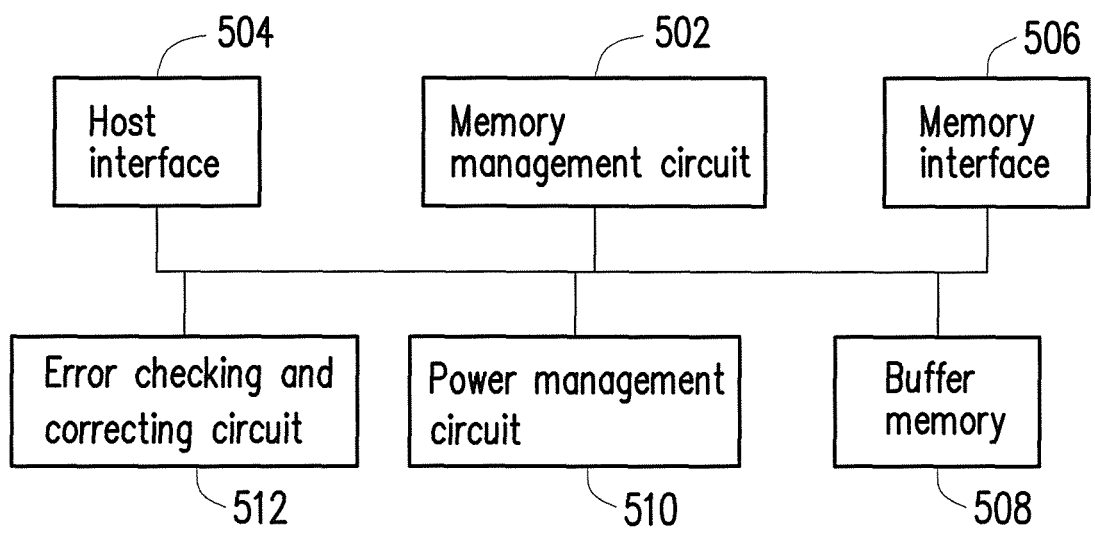
FIG. 5 is a schematic block diagram showing the memory control circuit unit according to an exemplary embodiment of the invention.

FIG. 5 is a schematic block diagram showing the memory control circuit unit according to an exemplary embodiment of the invention.

Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. When the memory storage device 10 operates, the control commands are executed to perform various operations such as data writing, data reading, and data erasing. The following description of the operation of the memory management circuit 502 is equivalent to describing the operation of the memory control circuit unit 404.

In this exemplary embodiment, the control commands of the memory management circuit 502 are implemented in a firmware form. For instance, the memory management circuit 502 has a microprocessor unit (not shown) and a read only memory (not shown), and the control commands are burnt into the read only memory. When the memory storage device 10 operates, the control commands are executed by the microprocessor unit for performing various operations, such as data writing, data reading, and data erasing.

According to another exemplary embodiment of the invention, the control commands of the memory management circuit 502 may also be stored in a specific region (for example, a system region in the memory module exclusively used for storing system data) of the rewritable non-volatile memory module 406 in the form of program codes. Moreover, the memory management circuit 502 has the microprocessor unit (not shown), the read only memory (not shown), and a random access memory (not shown). In particular, the read only memory has a boot code. When the memory control circuit unit 404 is enabled, the boot code is first executed by the microprocessor unit for loading the control commands stored in the rewritable non-volatile memory module 406 to the random access memory of the memory management circuit 502. Afterwards, the microprocessor unit executes the control commands to perform various operations, such as data writing, data reading, and data erasing.

Additionally, in another exemplary embodiment, the control commands of the memory management circuit 502 may be implemented in a hardware form. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells of the rewritable non-volatile memory module 406 or a group thereof. The memory writing circuit is configured to give a writing command sequence to the rewritable non-volatile memory module 406 to write data into the rewritable non-volatile memory module 406. The memory reading circuit is configured to give a reading command sequence to the rewritable non-volatile memory module 406 to read data from the rewritable non-volatile memory module 406. The memory erasing circuit is configured to give an erasing command sequence to the rewritable non-volatile memory module 406 to erase data from the rewritable non-volatile memory module 406. The data processing circuit is configured to process data that is to be written into the rewritable non-volatile memory module 406 and data read from the rewritable non-volatile memory module 406. The writing command sequence, the reading command sequence, and the erasing command sequence may respectively include one or more program codes or command codes and be used to instruct the rewritable non-volatile memory module 406 to execute the corresponding writing, reading, and erasing operations. In an exemplary embodiment, the memory management circuit 502 may give other types of command sequences to the rewritable non-volatile memory module 406 to instruct the rewritable non-volatile memory module 406 to execute corresponding operations.

The host interface 504 is coupled to the memory management circuit 502 and configured to receive and identify the commands and data transmitted from the host system 11. In other words, the commands and data transmitted by the host system 11 are transmitted to the memory management circuit 502 through the host interface 504. In this exemplary embodiment, the host interface 504 is compatible with the SATA standard. However, it should be understood that the invention is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, the data that is to be written into the rewritable non-volatile memory module 406 is converted to a format acceptable to the rewritable non-volatile memory module 406 through the memory interface 506. Specifically, when the memory management circuit 502 is to access the rewritable non-volatile memory module 406, the memory interface 506 transmits corresponding command sequences. For example, the command sequences may include the writing command sequence for instructing to write data, the reading command sequence for instructing to read data, the erasing command sequence for instructing to erase data, and command sequences for instructing to execute various memory operations (e.g. change the level of the reading voltage or execute a trash recycling procedure). The command sequences are generated by the memory management circuit 502 and transmitted to the rewritable non-volatile memory module 406 through the memory interface 506, for example. The command sequences may include one or more signals or data on the bus. The signals or data may include command codes or program codes. For example, the reading command sequence includes information, such as identification code and memory address, of the reading.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to execute an error checking and correcting procedure to ensure correctness of data. To be more specific, when the memory management circuit 502 receives a writing command from the host system 11, the error checking and correcting circuit 508 generates an error correcting code (ECC) and/or an error detecting code (EDC) for the data corresponding to the writing command, and the memory management circuit 502 writes the data corresponding to the writing command and the corresponding error correcting code and/or the error detecting code to the rewritable non-volatile memory module 406. Afterward, when the memory management circuit 502 reads the data from the rewritable non-volatile memory module 406, the corresponding error correcting code and/or the error detecting code is also read simultaneously, and the error checking and correcting circuit 508 executes the error checking and correcting procedure for the read data according to the error correcting code and/or the error detecting code.

The buffer memory 510 is coupled to the memory management circuit 502 and configured to temporarily store data and commands from the host system 11 or data from the rewritable non-volatile memory module 406. The power management circuit 512 is coupled to the memory management circuit 502 and configured to control the power of the memory storage device 10.

Figure 6:
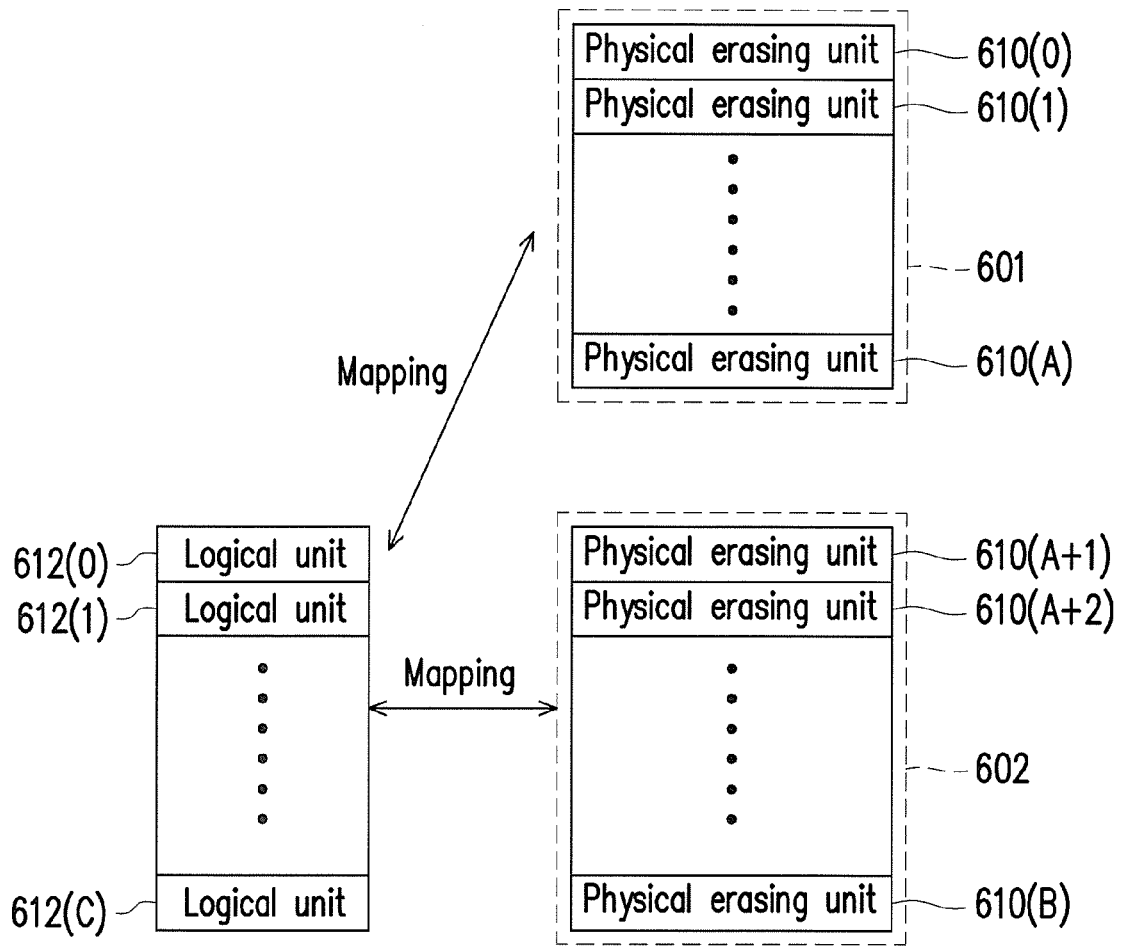
FIG. 6 is a schematic diagram showing management of the rewritable non-volatile memory module according to an exemplary embodiment of the invention.

FIG. 6 is a schematic diagram showing management of the rewritable non-volatile memory module according to an exemplary embodiment of the invention.

It should be understood that terms, such as "select," "group," and so forth, are logical concepts which describe operations on physical erasing units of the rewritable non-volatile memory module 406. That is, the physical erasing units of the rewritable non-volatile memory module 406 are logically operated, and the actual positions of the physical erasing units are not changed.

In this exemplary embodiment, the memory cells of the rewritable non-volatile memory module 406 form a plurality of physical programming units, and the physical programming units form a plurality of physical erasing units. Specifically, the memory cells on the same word line form one or a plurality of physical programming units. If each memory cell stores two bits or more, the physical programming units on the same word line may at least be categorized as a lower physical programming unit and an upper physical programming unit. For example, a least significant bit (LSB) of one memory cell belongs to the lower physical programming unit while a most significant bit (MSB) of one memory cell belongs to the upper physical programming unit. Generally speaking, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit is a physical page or a physical sector. If the physical programming unit is one physical page, the physical programming units usually include a data bit region and a redundancy bit region. The data bit region includes a plurality of physical sectors for storing user data, and the redundancy bit region is configured to store system data (e.g. error correcting code). In this exemplary embodiment, the data bit region includes 32 physical sectors, and each physical sector is 512 bytes (B). However, in other exemplary embodiments, the data bit region may include 8, 16, or more or fewer physical sectors. The size of each physical sector may be bigger or smaller. On the other hand, the physical erasing unit is the minimum unit for erasing. That is, each physical erasing unit has a minimum number of memory cells for being erased together. The physical erasing unit is a physical block, for example.

Referring to FIG. 6, the memory management circuit 502 logically groups the physical erasing units 610(0)-610(B) of the rewritable non-volatile memory module 406 into a SLC region 601 and a MLC region 602.

The memory management circuit 502 allocates logical units 612(0)-612(C) to map to a part of the physical erasing units 610(0)-610(A) of the SLC region 601 and a part of the physical erasing units 610(A+1)-610(B) of the MLC region 602. In this exemplary embodiment, the host system 11 accesses data in the SLC region 601 and the MLC region 602 through a logical address (LA), for example. Therefore, each of the logical units 612(0)-612(C) refers to one logical address. Furthermore, each of the logical units 612(0)-612(C) may refer to a logical programming unit or a logical erasing unit, or may be composed of a plurality of consecutive or nonconsecutive logical addresses. Moreover, each of the logical units 612(0)-612(C) may be mapped to one or more physical erasing units. It should be noted that, although this exemplary embodiment of the invention illustrates an example where the memory management circuit 502 logically groups the physical erasing units 610(0)-610(B) of the rewritable non-volatile memory module 406 into the SLC region 601 and the MLC region 602, the invention is not limited thereto. In another exemplary embodiment, the memory management circuit 502 may logically group the physical erasing units 610(0)-610(B) of the rewritable non-volatile memory module 406 into a SLC region and a TLC region, for example.

The memory management circuit 502 records a mapping relation between the logical units and the physical erasing units (also called a logical-physical mapping relation) in at least one logical-physical mapping table. When the host system 11 is to read data from or write data into the memory storage device 10, the memory management circuit 502 may access data of the memory storage device 10 according to the logical-physical mapping table.

In this exemplary embodiment, the memory management circuit 502 configures the physical erasing units 610(0)-610(A) belonging to the SLC region 601 (referred to as first physical erasing units hereinafter) to be initially (or only) programmed based on a programming mode (referred to as a first programming mode hereinafter) and configures the physical erasing units 610(A+1)-610(B) belonging to the MLC region 602 (referred to as second physical erasing units hereinafter) to be initially programmed based on another programming mode (referred to as a second programming mode hereinafter). Generally, a programming speed of programming the memory cells based on the first programming mode is higher than a programming speed of programming the memory cells based on the second programming mode. In addition, a reliability of the data stored based on the first programming mode is usually higher than a reliability of the data stored based on the second programming mode.

In this exemplary embodiment, the first programming mode refers to one of the following: a single layer memory cell mode (SLC mode), a lower physical programming mode, a mixture programming mode, and a less layer memory cell mode. In the SLC mode, one memory cell only stores one bit of data. In the lower physical programming mode, only the lower physical programming unit is programmed, and the upper physical programming unit corresponding to the lower physical programming unit may not be programmed. In the mixture programming mode, valid data (or real data) is programmed into the lower physical programming unit while dummy data is programmed into the upper physical programming unit corresponding to the lower physical programming unit that stores the valid data. In the less layer memory cell mode, one memory cell stores a first number of bits of data. The first number may be set to "1", for example.

In this exemplary embodiment, the second programming mode refers to a MLC programming mode, a TLC programming mode, or a similar mode. In the second programming mode, one memory cell stores a second number of bits of data, wherein the second number is equal to or greater than "2". The second number may be set to "2" or "3", for example. In another exemplary embodiment, the first number in the first programming mode and the second number in the second programming mode may be other numbers given that the second number is greater than the first number.

Figure 7:
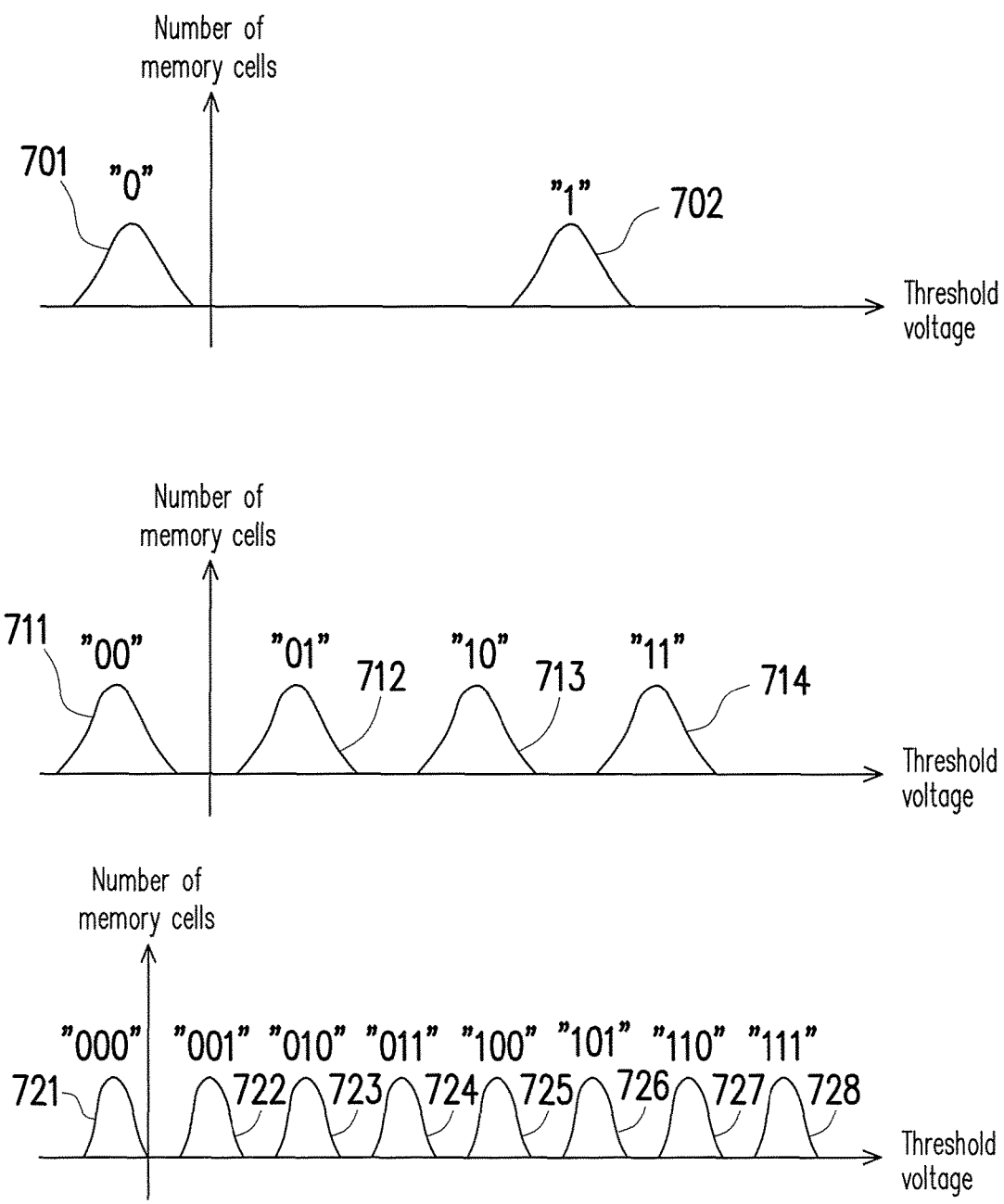
FIG. 7 is a schematic diagram showing the threshold voltage distribution of the memory cells according to an exemplary embodiment of the invention.

FIG. 7 is a schematic diagram showing a threshold voltage distribution of the memory cells according to an exemplary embodiment of the invention.

Referring to FIG. 7, in this exemplary embodiment, if a plurality of memory cells are programmed based on the first programming mode, the threshold voltage distribution of the programmed memory cells may include a distribution 701 and a distribution 702. For example, if one memory cell is programmed to store the bit "0", the threshold voltage of the memory cell belongs to the distribution 701; and if one memory cell is programmed to store the bit "1", the threshold voltage of the memory cell belongs to the distribution 702. In another exemplary embodiment, however, the memory cell whose threshold voltage belongs to the distribution 701 may also be used to store the bit "1" and the memory cell whose threshold voltage belongs to the distribution 702 may also be used to store the bit "0. Moreover, if a plurality of memory cells are programmed based on the second programming mode, the threshold voltage distributions of the programmed memory cells may include distributions 711-714 or distributions 721-728.

In an exemplary embodiment where the second number is "2", if one memory cell is programmed to store the bit "00", the threshold voltage of the memory cell belongs to the distribution 711; if one memory cell is programmed to store the bit "01", the threshold voltage of the memory cell belongs to the distribution 712; if one memory cell is programmed to store the bit "10", the threshold voltage of the memory cell belongs to the distribution 713; and if one memory cell is programmed to store the bit "11", the threshold voltage of the memory cell belongs to the distribution 714. In another exemplary embodiment, however, the memory cells whose threshold voltages belong to the distributions 711-714 may also be used to respectively store the bits "11", "10", "01", and "00" or any bit value totaling "2".

In an exemplary embodiment where the second number is "3", the memory cells belonging to the distributions 721-728 are respectively used to store the bits "000", "001", "010", "011", "100", "101", "110", and "111". In another exemplary embodiment, however, the memory cells belonging to the distributions 721-728 may also be used to respectively store the bits "111", "110", "101", "100", "011", "010", "001", and "000" or any bit value totaling "3".

Figure 8:
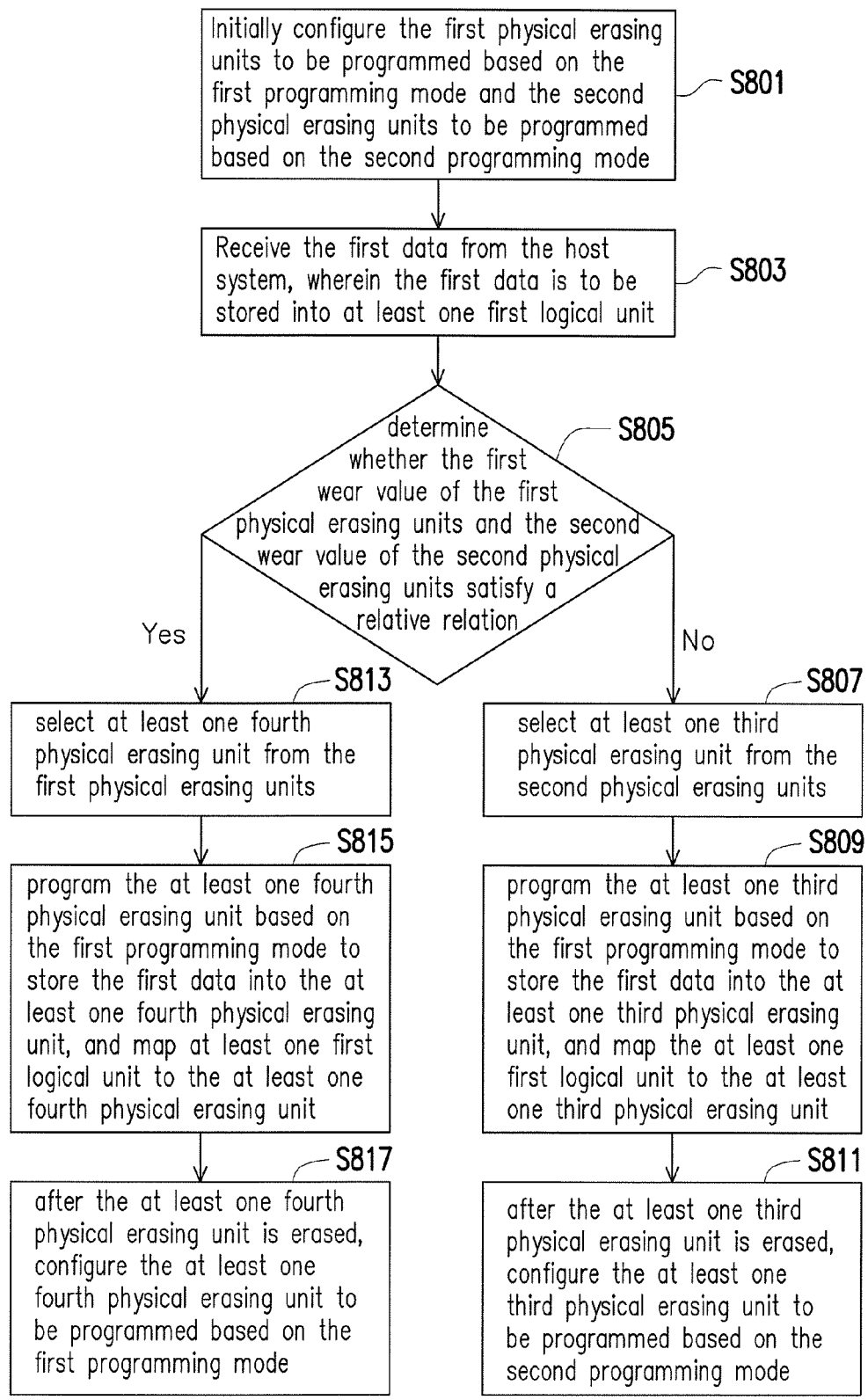
FIG. 8 is a flowchart of the memory management method executed by the memory control circuit unit (or memory management circuit) according to an exemplary embodiment of the invention.
Figure 9:
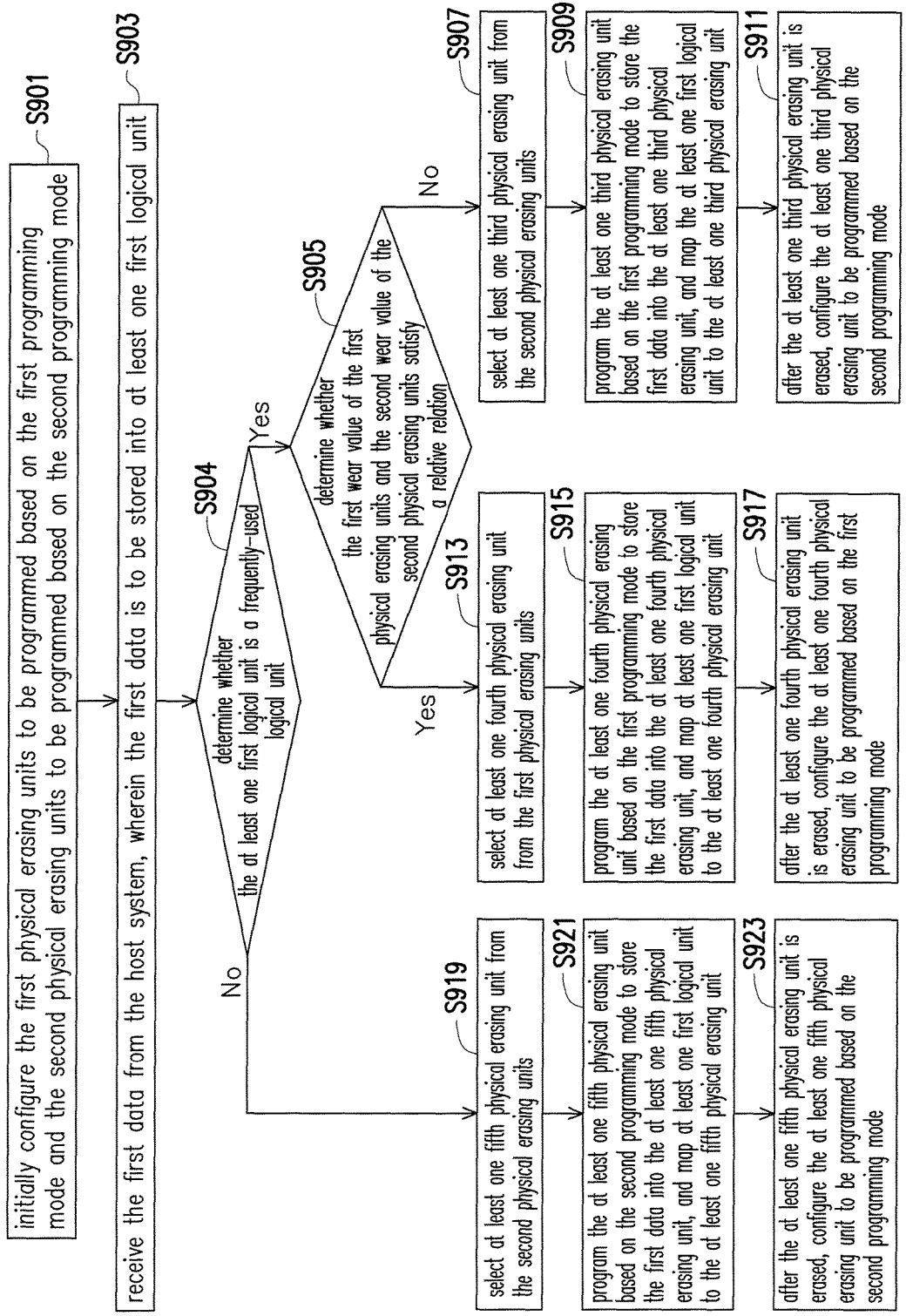
FIG. 9 is a flowchart of the memory management method executed by the memory control circuit unit (or memory management circuit) according to another exemplary embodiment of the invention.
Figure 10A:
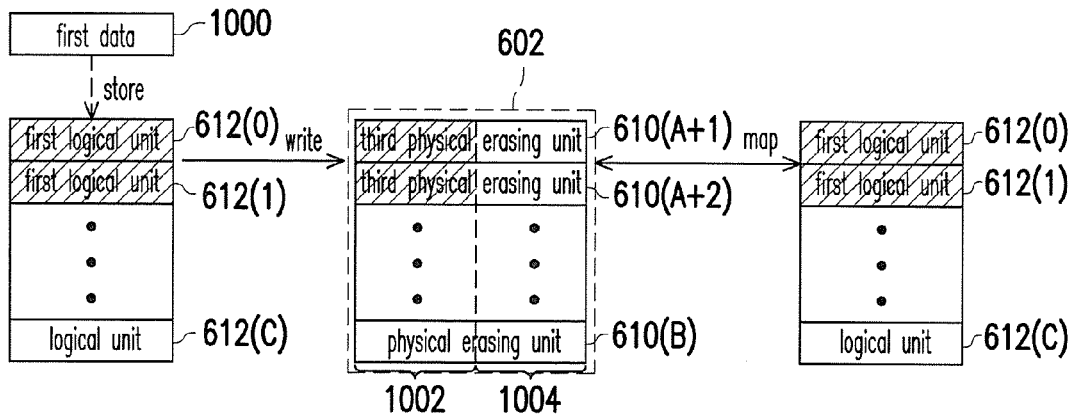
FIG. 10A to FIG. 10C are schematic diagrams showing the memory control circuit unit (or memory management circuit) executing the memory management method according to an exemplary embodiment of the invention.
Figure 10B:
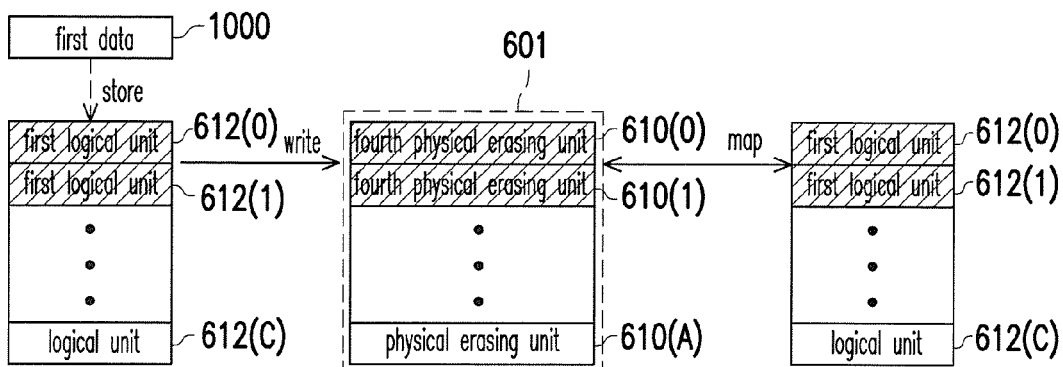
Figure 10C:
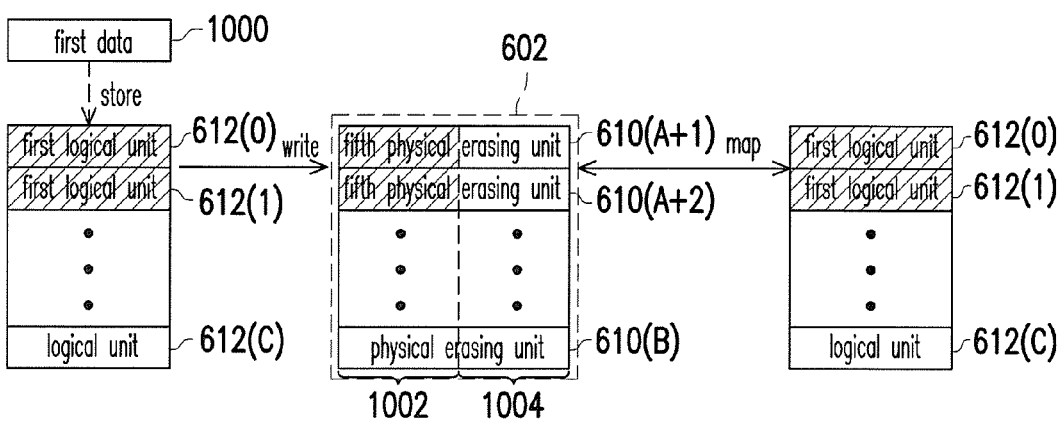

In order to facilitate the description, the following exemplary embodiments illustrate an example where the first programming mode is the less layer memory cell mode in which each memory cell stores "1" bit of data, and an example where the second programming mode is a programming mode in which each memory cell stores "2" or "3" bits of data. Nevertheless, in other exemplary embodiments, the first programming mode and the second programming mode may both be used given that the aforementioned condition is met. In addition, in order to more clearly explain how the memory management circuit 502 executes the memory management method according to the invention, several examples are described hereinafter with reference to FIG. 8, FIG. 9, and FIG. 10A to FIG. 10C. FIG. 8 and FIG. 9 are flowcharts of the memory management method executed by the memory control circuit unit (or memory management circuit) according to different exemplary embodiments of the invention. FIG. 10A to FIG. 10C are schematic diagrams showing the memory control circuit unit (or memory management circuit) executing the memory management method according to an exemplary embodiment of the invention.

Referring to FIG. 8 and FIG. 10A, first, as described above, in Step S801, the memory management circuit 502 initially configures the first physical erasing units to be programmed based on the first programming mode and the second physical erasing units to be programmed based on the second programming mode. For example, the first physical erasing units 610(0)-610(A) belonging to the SLC region 601 are initially configured to be programmed based on the first programming mode and the second physical erasing units 610(A+1)-610(B) belonging to the MLC region 602 are initially configured to be programmed based on the second programming mode.

Next, in Step S803, when the host system 11 is to store data, the host system 11 sends a writing command to the memory storage device 10. The writing command instructs to store the data in one certain logical unit (also referred to as at least one first logical unit) and the data stored in the at least one first logical unit (also referred to as first data 1000) is deemed as data belonging to the at least one first logical unit. In other words, the memory management circuit 502 receives the first data 1000 from the host system 11.

In Step S805, the memory management circuit 502 determines whether a wear value (also referred to as a first wear value) of the first physical erasing units 610(0)-610(A) and a wear value (also referred to as a second wear value) of the second physical erasing units 610(A+1)-610(B) satisfy a relative relation. Here, the relative relation refers to a case where the first wear value is not greater than the second wear value, or a case where the first wear value is smaller than or equal to the second wear value. In other words, the memory management circuit 502 determines whether the first wear value of the first physical erasing units 610(0)-610(A) is not greater than the second wear value of the second physical erasing units 610(A+1)-610(B). However, the invention is not intended to limit the definition of the relative relation. For example, in another exemplary embodiment, the relative relation may be a case where the first wear value is greater than the second wear value.

The wear values of the first physical erasing units and the second physical erasing units are used for comparison of the wear degrees. An example is described below, in which the first wear value is an erase count of the first physical erasing units and the second wear value is an erase count of the second physical erasing units. However, it should be noted that the invention is not intended to limit the wear value to a certain type. For example, the first wear value of the first physical erasing units may be one of the erase count, a read count, a program count, an error bit number of the error correcting code and a low-density parity-check syndrome sum of the first physical erasing units or a combination thereof; and the second wear value may be one of the erase count, a read count, a program count, an error bit number of the error correcting code and a low-density parity-check syndrome sum of the second physical erasing units or a combination thereof. In other words, the wear value may be any value that can be used for determining the wear degree.

In this exemplary embodiment, the memory management circuit 502 records a total erase count for the first physical erasing units (also referred to as a first total erase count) and a total erase count for the second physical erasing units (also referred to as a second total erase count). Specifically, the erase count of each of the physical erasing units 610(0)-610(B) is limited. Here, a method of recording the erase count is described based on an example where the SLC region 601 is configured to be programmed based on the first programming mode and the MLC region 602 is initially configured to be programmed based on the second programming mode. Because a density of data recorded in the MLC region 602 is twice as much as a density of data recorded in the SLC region 601, each of the second physical erasing units 610(A+1)~610(B) of the MLC region 602 is damaged after being erased 10,000 times in average (also referred to as a first maximum erase count), and each of the first physical erasing units 610(0)-610(A) of the SLC region 601 is damaged after being erased 100,000 times in average (also referred to as a second maximum erase count). When the wear of the physical erasing units causes loss of partial storage capacity or significant performance degradation, the data stored by the user may be lost or data may not be stored. In particular, the wear of the physical erasing units is determined by the number of times that each physical erasing unit is programmed or erased. That is, if one physical erasing unit is programmed (or written) only once and is not programmed thereafter, the degree of wear of the physical erasing unit is relatively low. On the contrary, if one physical erasing unit is programmed and erased repeatedly, the degree of wear of the physical erasing unit is relatively high. For example, when one of the first physical erasing units 610(0)-610(A) of the rewritable non-volatile memory module 406 is erased, the memory management circuit 502 adds 1 to the first total erase count corresponding to the first physical erasing units 610(0)-610(A); and when one of the second physical erasing units 610(A+1)-610(B) of the rewritable non-volatile memory module 406 is erased, the memory management circuit 502 adds 1 to the second total erase count corresponding to the second physical erasing units 610(A+1)-610(B). For example, the first total erase count and the second total erase count may be recorded in an erasing number table or in the corresponding physical erasing units. Generally, 8%-9% of the capacity of the rewritable non-volatile memory module 406 is set as the SLC region 601 and the other 91%-92% of the capacity is set as the MLC region 602 considering the characteristics that the SLC region 601 has longer lifetime, higher speed, smaller capacitor, and is costly and that the MLC region 602 has larger capacity and is less costly. Accordingly, the first maximum erase count (e.g. 10,000 times) of each of the first physical erasing units is greater than the second maximum erase count (e.g. 100,000 times) of each of the second physical erasing units, and the total number of the first physical erasing units is smaller than the total number of the second physical erasing units.

Because the first maximum erase count of each of the first physical erasing units is different from the second maximum erase count of each of the second physical erasing units, the memory management circuit 502 adopts different references to determine whether the erase count of the first physical erasing units is greater than the erase count of the second physical erasing units. Thus, in this exemplary embodiment, the memory management circuit 502 performs weighted calculation on the erase count of the first physical erasing units (i.e. the first wear value) or the erase count of the second physical erasing units (i.e. the second wear value) based on a weight value, and then compares the weighted result (i.e. the first wear value) with the second wear value. The weight value is used such that the erase count of the first physical erasing units and the erase count of the second physical erasing units are compared equally. The weight value may be set according to the technical specifications of the memory storage device 10 when the memory storage device 10 is completed at the factory or according to the configuration structure of the rewritable non-volatile memory module 406 of the memory storage device 10, for example.

Specifically, before the step of determining whether the first wear value of the first physical erasing units and the second wear value of the second physical erasing units satisfy the relative relation, the memory management circuit 502 first calculates a maximum total erase count (also referred to as a first maximum total erase count) corresponding to the first physical erasing units according to the first maximum erase count and the total number of the first physical erasing units, and calculates a maximum total erase count (also referred to as a second maximum total erase count) corresponding to the second physical erasing units according to the second maximum erase count and the total number of the second physical erasing units, so as to obtain the weight value. In an example where the first maximum erase count is 10,000, the second maximum erase count is 100,000, the total number of the first physical erasing units is 60, and the total number of the second physical erasing units is 100, the first maximum total erase count is 600,000 times (i.e. 10,000 times*60) and the second maximum total erase count is 10 million times. Accordingly, the memory management circuit 502 divides the second maximum total erase count (i.e. 10 million times) by the first maximum total erase count (600,000 times) to obtain the weight value, which is about 16.7 (i.e. 10 million times/600,000 times). Here, it is assumed that the first total erase count and the second total erase count recorded by the memory management circuit 502 are 500,000 times and 600,000 times. Then, the memory management circuit 502 sets a number of times obtained by multiplying the first total erase count (i.e. 500,000 times) by the weight value (i.e. 16.7) as the first wear value (i.e. 8.33 million times) and directly sets the second total erase count (i.e. 600,000) as the second wear value. Thereafter, the memory management circuit 502 uses the first wear value (i.e. 8.33 million times) and the second wear value (i.e. 600,000 times) to determine whether the wear degree of the first physical erasing units is greater than the wear degree of the second physical erasing units on an equal basis.

It should be noted that the invention is not intended to limit the method of recording the numbers of times of erasing to determine whether the degree of wear of the first physical erasing units is greater than the degree of wear of the second physical erasing units. In another exemplary embodiment, for example, the memory management circuit 502 calculates an average erase count (also referred to as a first average erase count) corresponding to each of the first physical erasing units and an average erase count (also referred to as a second average erase count) corresponding to each of the second physical erasing units for comparing the erase count corresponding to the first physical erasing units and the erase count corresponding to the second physical erasing units on an equal basis. In an example where the recorded first total erase count is 500,000 times, the recorded second total erase count is 600,000 times, the total number of the first physical erasing units is 60, and the total number of the second physical erasing units is 100, the first average erase count is 8,333 times (i.e. 500,000 times/60) and the second average erase count is 600 times (i.e. 600,000 times/1000). Therefore, the memory management circuit 502 sets the first average erase count as the first wear value and sets the second average erase count as the second wear value for determining whether the wear degree of the first physical erasing units is greater than the wear degree of the second physical erasing units.

In the above exemplary embodiment, the obtained first wear value (i.e. 8.33 million or 8,333 times) is greater than the obtained second wear value (i.e. 600,000 or 600 times). That is, the memory management circuit 502 determines that the first wear value and the second wear value do not satisfy the relative relation. In other words, the memory management circuit 502 determines that the degree of wear of the MLC region 602 is lower than the degree of wear of the SLC region 601. Accordingly, in Step S807, the memory management circuit 502 selects at least one physical erasing unit (also referred to as a third physical erasing unit) from the second physical erasing units of the MLC region 602 that is less worn for writing the received first data 1000. As shown in FIG. 10A, the writing command sent by the host system 11 is for instructing to store the first data 1000 into the first logical units 612(0)-612(1), and the memory management circuit 502 selects the third physical erasing units 610(A+1)-610(A+2) from the second physical erasing units for writing the received first data 1000.

Next, in Step S809, the memory management circuit 502 programs the third physical erasing units 610(A+1)-610(A+2) selected from the second physical erasing units, which are originally initially configured to be programmed based on the second programming mode, based on the first programming mode. In this exemplary embodiment, in the lower physical programming mode of the first programming mode, only a lower physical programming unit 1002 is programmed while an upper physical programming unit 1004 corresponding to the lower physical programming unit 1002 may not be programmed. Thus, the memory management circuit 502 writes the first data 1000 into the lower physical programming units 1002 of the third physical erasing units 610(A+1)-610(A+2) sequentially and maps the first logical units 612(0)-612(1) to the lower physical programming units 1002 of the third physical erasing units 610(A+1)-610(A+2).

Then, in Step S811, if the first data corresponding to the first logical units 612(0)-612(1) is updated, after the third physical erasing units 610(A+1)-610(A+2) are erased, the memory management circuit 502 classifies the third physical erasing units 610(A+1)-610(A+2), which have been configured to be programmed based on the first programming mode, into the second physical erasing units belonging to the MLC region 602 and reconfigures the physical erasing units 610(A+1)-610(A+2) as physical erasing units that are originally configured to be programmed based on the second programming mode.

Referring to FIG. 8 and FIG. 10B, in another exemplary embodiment, it is assumed that the obtained first wear value is not greater than the obtained second wear value in Step S805. That is, the memory management circuit 502 determines that the first wear value and the second wear value satisfy the relative relation. In other words, the wear degree of the SLC region 601 is lower than the wear degree of the MLC region 602. Thus, in Step S813, the memory management circuit 502 selects at least one physical erasing unit (also referred to as a fourth physical erasing unit) from the first physical erasing units of the SLC region 601 that is less worn for writing the received first data 1000. As shown in FIG. 10B, the writing command sent by the host system 11 is for instructing to store the first data 1000 into the first logical units 612(0)-612(1), and the memory management circuit 502 selects the fourth physical erasing units 610(0)-610(1) from the first physical erasing units for writing the received first data 1000.

Next, in Step S815, the memory management circuit 502 programs the fourth physical erasing units 610(0)-610(1) selected from the first physical erasing units, which are originally configured to be programmed based on the first programming mode, based on the first programming mode and maps the first logical units 612(0)-612(1) to the fourth physical erasing units 610(0)-610(1).

Thereafter, in Step S817, if the first data 1000 corresponding to the first logical units 612(0)-612(1) is updated, after the fourth physical erasing units 610(0)-610(1) are erased, the memory management circuit 502 still classifies the fourth physical erasing units 610(0)-610(1), which are configured to be programmed based on the first programming mode, into the first physical erasing units belonging to the SLC region 601. That is, the original configuration of the physical erasing units 610(0)-610(1) is not changed and the physical erasing units 610(0)-610(1) remain to be programmed based on the first programming mode.

The exemplary embodiment of FIG. 9 is similar to the exemplary embodiment of FIG. 8, and a difference therebetween lies in that: in the exemplary embodiment of FIG. 9, the memory management circuit 502 executes the step of determining whether the first wear value and the second wear value satisfy the relative relation only when the first logical unit, into which the first data written by the host system 11 is to be stored, is a frequently-used logical unit. Here, a purpose of determining whether the first logical unit is the frequently-used logical unit is to confirm whether the first data written by the host system 11 is information that needs to be accessed frequently or a specific table for management. That is, in the exemplary embodiment of FIG. 9, the operation of comparing the wear degrees of the two regions to select the less worn region from the SLC region 601 and the MLC region 602 for writing the data is performed only when the data written by the host system 11 is the information that needs to be accessed frequently or the specific table for management.

Referring to FIG. 9 and FIG. 10C, Step S901 and Step S903 are the same as Step S801 and Step S803 of FIG. 8. Thus, details thereof are not repeated hereinafter. After the memory management circuit 502 receives the first data that is to be stored into at least one first logical unit, in Step S904, the memory management circuit 502 further determines whether the at least one first logical unit is the frequently-used logical unit. Specifically, the memory management circuit 502 records a value of usage count of each logical unit for determining whether the value of usage count is greater than a value of a usage count threshold. For example, a number of times that the host system 11 gives the writing command to each logical unit is recorded during the operation of the memory storage device 10 to serve as the value of usage count. Likewise, the value of usage count may be recorded in a usage counter table, and when the memory storage device 10 operates, the memory management circuit 502 loads the usage counter table into the buffer memory 510 for reading and updating. Here, the value of the usage count threshold is set by the designer of the memory storage device when the memory storage device is completed at the factory. In other words, the value of the usage count threshold is a choice in the design of the memory storage device and may be adjusted and optimized as required. In addition, the invention is not intended to limit the method of determining whether the written data is the frequently-accessed specific data or the method of determining whether the at least one first logical unit is the frequently-used logical unit. For example, in another exemplary embodiment, the memory management circuit 502 may directly determine whether the received data is the information that needs to be accessed frequently or the specific table for management according to the type, size, or format of the data. In yet another exemplary embodiment of the invention, the memory management circuit 502 counts a value of continuous usage count of each logical unit and determines whether the value of continuous usage count of the logical unit reaches a value of continuous usage count threshold, so as to decide whether the logical unit is a frequently-used logical unit; or the memory management circuit 502 determines whether the value of usage count of the logical unit reaches a value of predetermined threshold in a predetermined time, so as to decide whether the logical unit is a frequently-used logical unit.

If the value of usage count of the at least one first logical unit is greater than the value of the usage count threshold, the memory management circuit 502 determines that the at least one first logical unit is the frequently-used logical unit and performs the operation of leveling the wear degrees of the SLC region 601 and the MLC region 602 as shown in Steps S905 to S917, so as to slow down the wearing of the region that is seriously worn, such that the wear of the physical erasing units of the SLC region 601 and the wear of the physical erasing units of the MLC region 602 are leveled. Likewise, Step S905 to Step S917 of FIG. 9 are the same as Step S805 to Step S817 of FIG. 8. Thus, details thereof are not repeated hereinafter.

Particularly, in Step S904, if the memory management circuit 502 determines that the at least one first logical unit is not the frequently-used logical unit, the memory management circuit 502 performs a general writing operation and uses the physical erasing units of the MLC region 602 that has a greater capacity to record the received general file data. For example, in Step S919, the memory management circuit 502 selects at least one physical erasing unit (also referred to as a fifth physical erasing unit) from the second physical erasing units of the MLC region 602 for writing the received first data 1000. As shown in FIG. 10C, the writing command sent by the host system 11 is for instructing to store the first data 1000 into the first logical units 612(0)-612(1), and the memory management circuit 502 selects the fifth physical erasing unit 610(A+1) from the second physical erasing units for writing the received first data 1000.

Next, in Step S921, the memory management circuit 502 programs the fifth physical erasing unit 610(A+1) selected from the second physical erasing units, which are originally initially configured to be programmed based on the second programming mode, based on the second programming mode and maps the first logical units 612(0)-612(1) to the fifth physical erasing unit 610(A+1). It should be noted that, in this exemplary embodiment, in the MLC programming mode of the second programming mode, the lower physical programming unit 1002 and the upper physical programming unit 1004 are both used to store data, and when the data is written by the second programming mode, the memory management circuit 502 executes the programming operation on the lower physical programming unit 1002 and the upper physical programming unit 1004 of one physical erasing unit. Thus, the memory management circuit 502 writes the first data 1000 into the lower physical programming unit 1002 and the upper physical programming unit 1004 of the fifth physical erasing unit 610(A+1) sequentially and maps the first logical units 612(0)-612(1) to the lower physical programming unit 1002 and the upper physical programming unit 1004 of the fifth physical erasing unit 610(A+1).

Thereafter, in Step S923, if the first data corresponding to the first logical units 612(0)-612(1) is updated, after the fifth physical erasing unit 610(A+1) is erased, the memory management circuit 502 classifies the fifth physical erasing unit 610(A+1) into the second physical erasing units belonging to the MLC region 602 without changing the configuration of the physical erasing unit 610(A+1). In other words, the physical erasing unit 610(A+1) remains to be programmed based on the second programming mode. Accordingly, the wear of the first physical erasing units of the SLC region 601 and the wear of the second physical erasing units of the MLC region 602 are leveled by using the frequently-accessed specific data, which not only achieves higher reading/writing speed but also efficiently levels the wear of the first physical erasing units and the wear of the second physical erasing units. Thus, decrease of the overall lifetime of the memory storage device resulting from different wear degrees of the SLC region and the MLC region (or TLC region) is improved efficiently.

Figure 11:
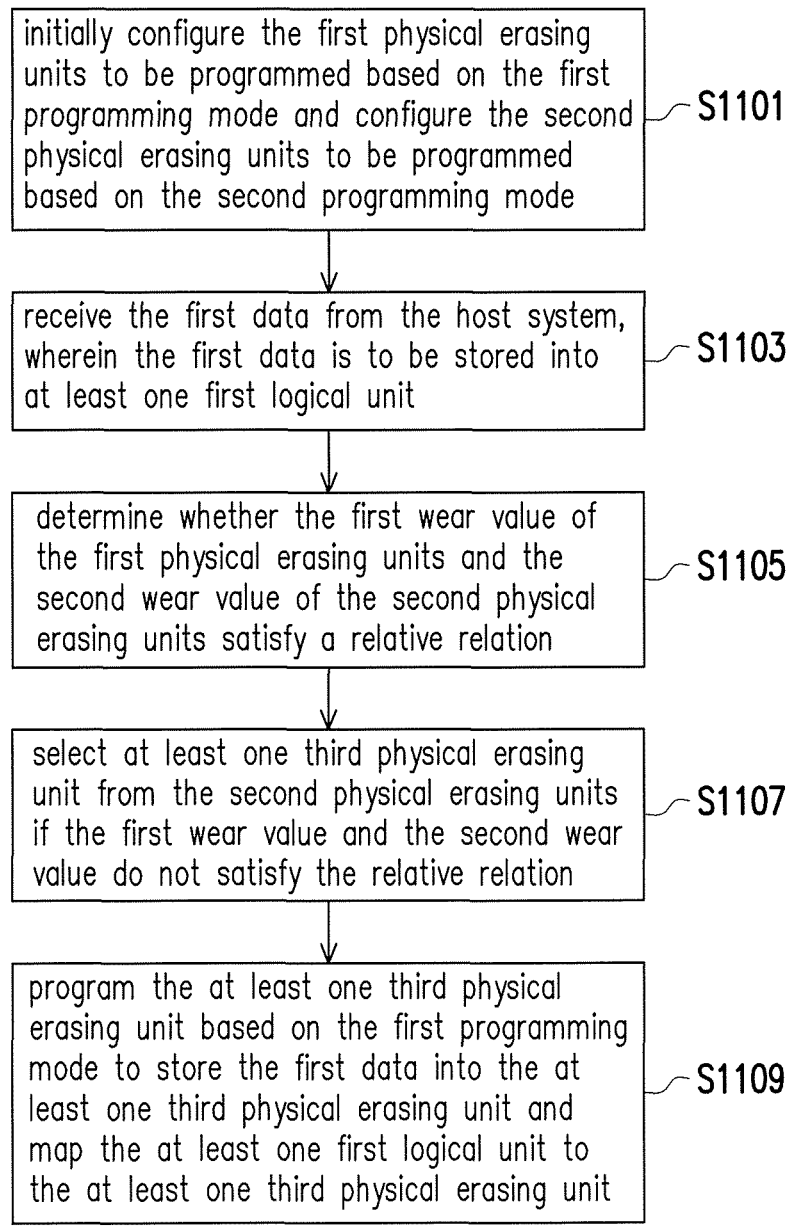
FIG. 11 is a flowchart showing the memory management method according to an exemplary embodiment of the invention.

FIG. 11 is a flowchart showing the memory management method according to an exemplary embodiment of the invention.

Referring to FIG. 11, in Step S1101, the memory management circuit 502 initially configures the first physical erasing units to be programmed based on the first programming mode and configures the second physical erasing units to be programmed based on the second programming mode.

In Step S1103, the memory management circuit 502 receives the first data from the host system 11, and the first data is to be stored into at least one first logical unit.

In Step S1105, the memory management circuit 502 determines whether the first wear value of the first physical erasing units and the second wear value of the second physical erasing units satisfy a relative relation.

If the first wear value and the second wear value do not satisfy the relative relation, in Step S1107, the memory management circuit 502 selects one or more third physical erasing units from the second physical erasing units.

Then, in Step S1109, the memory management circuit 502 programs the one or more third physical erasing units based on the first programming mode and maps the at least one first logical unit to the one or more third physical erasing units.

Details of each step of FIG. 11 have been specified above and thus are not repeated hereinafter. It should be noted that each step of FIG. 11 may be implemented as a plurality of program codes or circuits, and the invention is not intended to limit how each step is implemented. In addition, the method of FIG. 11 may be used in combination with the above-described exemplary embodiments or be used solely. Nevertheless, the invention is not limited thereto.

To conclude, the memory management method, the memory control circuit unit, and the memory storage device in the exemplary embodiments of the invention determine the wear degrees of the first physical erasing units configured to be programmed based on the first programming mode and the second physical erasing units initially configured to be programmed based on the second programming mode to dynamically select the physical erasing unit having low wear degree from the first physical erasing units or the second physical erasing units for updating or writing data. Moreover, the physical erasing unit selected from the first physical erasing units or the second physical erasing units is programmed based on the first programming mode, so as to keep the wear of the first physical erasing units and the wear of the second physical erasing units level and efficiently improve decrease of the overall lifetime of the memory storage device resulting from different degrees of wear of the SLC region and the MLC region (or TLC region). Furthermore, by performing the method of the exemplary embodiment to frequently access specific data to level the wear degrees of the SLC region and the MLC region (or TLC region), the overall reading/writing speed of the memory storage device is enhanced, and the SLC region for storing specific data and tables is provided with sufficient space without compressing the MLC region (or TLC region) that stores other data.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A memory management method for a rewritable non-volatile memory module which comprises a plurality of physical erasing units, the memory management method comprising:
    grouping a plurality of first physical erasing units of the plurality of physical erasing units into a first region and grouping a plurality of second physical erasing units of the plurality of physical erasing units into a second region;
    initially configuring the first physical erasing units of the first region to be programmed based on a first programming mode and the second physical erasing units of the second region to be programmed based on a second programming mode;
    receiving first data from a host system, wherein the first data is to be stored into at least a first logical unit;
    determining whether a first wear value of the first physical erasing units and a second wear value of the second physical erasing units satisfy a relative relation;
    selecting one or more third physical erasing units from the second physical erasing units of the second region if the first wear value and the second wear value do not satisfy the relative relation, wherein the relative relation is that the first wear value is not greater than the second wear value;
    grouping the one or more third physical erasing units from the second region to the first region; and
    programming the one or more third physical erasing units based on the first programming mode to store the first data into the one or more third physical erasing units, and mapping the at least one first logical unit to the one or more third physical erasing units.

2. The memory management method according to claim 1, further comprising:
    selecting at least a fourth physical erasing unit from the first physical erasing units if the first wear value and the second wear value satisfy the relative relation; and
    programming the one or more fourth physical erasing units based on the first programming mode to store the first data into the one or more fourth physical erasing units, and mapping the at least one first logical unit to the one or more fourth physical erasing units.

3. The memory management method according to claim 1, further comprising:
    determining whether the at least one first logical unit is a frequently-used logical unit; and
    executing the step of determining whether the first wear value and the second wear value satisfy the relative relation if the at least one first logical unit is the frequently-used logical unit.

4. The memory management method according to claim 3, wherein the step of determining whether the at least one first logical unit is the frequently-used logical unit comprises:
    determining whether a value of usage count of the at least one first logical unit is greater than a value of a usage count threshold and
    setting the at least one first logical unit as the frequently-used logical unit if the value of usage count of the at least one first logical unit is greater than the value of the usage count threshold.

5. The memory management method according to claim 1, further comprising:
    configuring the one or more third physical erasing units to be programmed based on the second programming mode after the one or more third physical erasing units is erased.

6. The memory management method according to claim 1,
    wherein the first wear value is one of a erase count, a read count, program count, an error bit number of an error correction code and a low-density parity-check syndrome sum of the first physical erasing units or a combination thereof, and the second wear value is one of a erase count, a read count, a program count, an error bit number of an error correcting code and a low-density parity-check syndrome sum of the second physical erasing units or a combination thereof.

7. The memory management method according to claim 1, wherein the first wear value is an erase count of the first physical erasing units and the second wear value is an erase count of the second physical erasing units, wherein a first maximum erase count of each of the first physical erasing units is greater than a second maximum erase count of each of the second physical erasing units, and a total number of the first physical erasing units is smaller than a total number of the second physical erasing units, wherein the memory management method further comprises:

recording a first total erase count for the first physical erasing units and recording a second total erase count for the second physical erasing units; and counting the first total erase count if at least one of the first physical erasing units is erased and counting the second total erase count if at least one of the second physical erasing units is erased.

8. The memory management method according to claim 6, wherein before the step of determining whether the first wear value of the first physical erasing units and the second wear value of the second physical erasing units satisfy the relative relation, the memory management method further comprises:

obtaining a first maximum total erase count of the first physical erasing units according to the first maximum erase count and the total number of the first physical erasing units;

obtaining a second maximum total erase count of the second physical erasing units according to the second maximum erase count and the total number of the second physical erasing units;

obtaining a weight value by calculating a ratio between the first maximum total erase count and the second maximum total erase count; and setting a product obtained by multiplying the first total erase count and the weight value as the first wear value and setting the second total erase count as the second wear value.

9. The memory management method according to claim 6, wherein before the step of determining whether the first wear value of the first physical erasing units and the second wear value of the second physical erasing units satisfy the relative relation, the memory management method further comprises:

obtaining a first average erase count corresponding to each of the first physical erasing units according to the first total erase count and the total number of the first physical erasing units, and setting the first average erase count as the first wear value; and obtaining a second average erase count corresponding to each of the second physical erasing units according to the second total erase count and the total number of the second physical erasing units, and setting the second average erase count as the second wear value.

10. The memory management method according to claim 1, wherein if a memory cell of the physical erasing units is programmed based on the first programming mode, data of a first number of bits is stored into the memory cell, and if the memory cell is programmed based on the second programming mode, data of a second number of bits is stored into the memory cell, wherein the first number is smaller than the second number.

11. A memory control circuit unit configured to control a rewritable non-volatile memory module which comprises a plurality of physical erasing units, the memory control circuit unit comprising:

a host interface coupled to a host system;

a memory interface coupled to the rewritable non-volatile memory module; and a memory management circuit coupled to the host interface and the memory interface, wherein the memory management circuit is configured to group a plurality of first physical erasing units of the plurality of physical erasing units into a first region and group a plurality of second physical erasing units of the plurality of physical erasing units into a second region, wherein the wherein the memory management circuit is further configured to initially configure the first physical erasing units of the first region to be programmed based on a first programming mode and the second physical erasing units of the second region to be programmed based on a second programming mode, wherein the memory management circuit is further configured to receive first data from the host system, and the first data is to be stored into at least a first logical unit, wherein the memory management circuit is further configured to determine whether a first wear value of the first physical erasing units and a second wear value of the second physical erasing units satisfy a relative relation, wherein the relative relation is that the first wear value is not greater than the second wear value, wherein the memory management circuit is further configured to select one or more third physical erasing units from the second physical erasing units of the second region if determining that the first wear value and the second wear value do not satisfy the relative relation, wherein the memory management circuit is further configured to group the one or more third physical erasing units from the second region to the first region, wherein the memory management circuit is further configured to transmit a first writing command sequence to instruct to program the one or more third physical erasing units based on the first programming mode to store the first data into the one or more third physical erasing units and map the at least one first logical unit to the one or more third physical erasing units.

12. The memory control circuit unit according to claim 11, wherein the memory management circuit is further configured to select at least a fourth physical erasing unit from the first physical erasing units if determining that the first wear value and the second wear value satisfy the relative relation, wherein the memory management circuit is further configured to transmit a second writing command sequence to instruct to program the one or more fourth physical erasing units based on the first programming mode to store the first data into the one or more fourth physical erasing units and map the at least one first logical unit to the one or more fourth physical erasing units.

13. The memory control circuit unit according to claim 11, wherein the memory management circuit is further configured to determine whether the at least one first logical unit is a frequently-used logical unit, wherein the memory management circuit is further configured to execute an operation of determining whether the first wear value and the second wear value satisfy the relative relation if determining that the at least one first logical unit is the frequently-used logical unit.

14. The memory control circuit unit according to claim 13, wherein in the operation of determining whether the at least one first logical unit is the frequently-used logical unit, the memory management circuit is further configured to determine whether a value of usage count of the at least one first logical unit is greater than a value of a usage count threshold, wherein the memory management circuit is further configured to set the at least one first logical unit as the frequently-used logical unit if determining that the value of usage count of the at least one first logical unit is greater than the value of the usage count threshold.

15. The memory control circuit unit according to claim 11, wherein after the one or more third physical erasing units is erased, the memory management circuit is further configured to configure the one or more third physical erasing units to be programmed based on the second programming mode.

16. The memory control circuit unit according to claim 11, wherein the first wear value is one of a erase count, a read count, a program count, and an error bit number of an error correcting code and a low-density parity-check syndrome sum of the first physical erasing units or a combination thereof, and the second wear value is one of a erase count, a read count, a program count, an error bit number of an error correcting code and a low-density parity-check syndrome sum of the second physical erasing units or a combination thereof.

17. The memory control circuit unit according to claim 11, wherein the first wear value is an erase count of the first physical erasing units and the second wear value is an erase count of the second physical erasing units, wherein a first maximum erase count of each of the first physical erasing units is greater than a second maximum erase count of each of the second physical erasing units, and a total number of the first physical erasing units is smaller than a total number of the second physical erasing units, wherein the memory management circuit is further configured to record a first total erase count for the first physical erasing units and record a second total erase count for the second physical erasing units, and wherein the memory management circuit is further configured to count the first total erase count when at least one of the first physical erasing units is erased and count the second total erase count when at least one of the second physical erasing units is erased.

18. The memory control circuit unit according to claim 16, wherein before the operation of determining whether the first wear value of the first physical erasing units and the second wear value of the second physical erasing units satisfy the relative relation, the memory management circuit is further configured to obtain a first maximum total erase count of the first physical erasing units according to the first maximum erase count and the total number of the first physical erasing units, wherein the memory management circuit is further configured to obtain a second maximum total erase count of the second physical erasing units according to the second maximum erase count and the total number of the second physical erasing units, wherein the memory management circuit is further configured to obtain a weight value by calculating a ratio between the first maximum total erase count and the second maximum total erase count, and wherein the memory management circuit is further configured to set a product obtained by multiplying the first total erase count and the weight value as the first wear value and set the second total erase count as the second wear value.

19. The memory control circuit unit according to claim 16, wherein before the operation of determining whether the first wear value of the first physical erasing units and the second wear value of the second physical erasing units satisfy the relative relation, the memory management circuit is further configured to obtain a first average erase count corresponding to each of the first physical erasing units according to the first total erase count and the total number of the first physical erasing units, and set the first average erase count as the first wear value, wherein the memory management circuit is further configured to obtain a second average erase count corresponding to each of the second physical erasing units according to the second total erase count and the total number of the second physical erasing units, and set the second average erase count as the second wear value.

20. The memory control circuit unit according to claim 11, wherein if a memory cell of the physical erasing units is programmed based on the first programming mode, data of a first number of bits is stored into the memory cell, and if the memory cell is programmed based on the second programming mode, data of a second number of bits is stored into the memory cell, wherein the first number is smaller than the second number.

21. A memory storage device, comprising:
a connection interface unit coupled to a host system;
a rewritable non-volatile memory module comprising a plurality of physical erasing units; and
a memory control circuit unit coupled to the connection interface unit and the rewritable non-volatile memory module, wherein the memory control circuit unit is configured to group a plurality of first physical erasing units of the plurality of physical erasing units into a first region and group a plurality of second physical erasing units of the plurality of physical erasing units into a second region, wherein the memory control circuit unit is further configured to initially configure the first physical erasing units of the first region to be programmed based on a first programming mode and the second physical erasing units of the second region to be programmed based on a second programming mode, wherein the memory control circuit unit is further configured to receive first data from the host system, and the first data is to be stored into at least a first logical unit, wherein the memory control circuit unit is further configured to determine whether a first wear value of the first physical erasing units and a second wear value of the second physical erasing units satisfy a relative relation, wherein the relative relation is that the first wear value is not greater than the second wear value, wherein the memory control circuit unit is further configured to select one or more third physical erasing units from the second physical erasing units of the second region if determining that the first wear value and the second wear value do not satisfy the relative relation, wherein the memory control circuit unit is further configured to group the one or more third physical erasing units from the second region to the first region, wherein the memory control circuit unit is further configured to transmit a first writing command sequence to instruct to program the one or more third physical erasing units based on the first programming mode to store the first data into the one or more third physical erasing units and map the at least one first logical unit to the one or more third physical erasing units.

22. The memory storage device according to claim 21, wherein the memory control circuit unit is further configured to select at least a fourth physical erasing unit from the first physical erasing units if determining that the first wear value and the second wear value satisfy the relative relation,
 wherein the memory control circuit unit is further configured to transmit a second writing command sequence to instruct to program the one or more fourth physical erasing units based on the first programming mode to store the first data into the one or more fourth physical erasing units and map the at least one first logical unit to the one or more fourth physical erasing units.

23. The memory storage device according to claim 21, wherein the memory control circuit unit is further configured to determine whether the at least one first logical unit is a frequently-used logical unit,
 wherein the memory control circuit unit is further configured to execute an operation of determining whether the first wear value and the second wear value satisfy the relative relation if determining that the at least one first logical unit is the frequently-used logical unit.

24. The memory storage device according to claim 23, wherein in the operation of determining whether the at least one first logical unit is the frequently-used logical unit, the memory control circuit unit is further configured to determine whether a value of usage count of the at least one first logical unit is greater than a value of a usage count threshold,
 wherein the memory control circuit unit is further configured to set the at least one first logical unit as the frequently-used logical unit if determining that the value of usage count of the at least one first logical unit is greater than the value of the usage count threshold.

25. The memory storage device according to claim 21, wherein after the one or more third physical erasing units is erased, the memory control circuit unit is further configured to configure the one or more third physical erasing units to be programmed based on the second programming mode.

26. The memory storage device according to claim 21, wherein the first wear value is one of a erase count, a read count, a program count, and an error bit number of an error correcting code and a low-density parity-check syndrome sum of the first physical erasing units or a combination thereof, and the second wear value is one of a erase count, a read count, a program count, and an error bit number of an error correcting code and a low-density parity-check syndrome sum of the second physical erasing units or a combination thereof.

27. The memory storage device according to claim 21, wherein the first wear value is an erase count of the first physical erasing units and the second wear value is an erase count of the second physical erasing units, wherein a first maximum erase count of each of the first physical erasing units is greater than a second maximum erase count of each of the second physical erasing units, and a total number of the first physical erasing units is smaller than a total number of the second physical erasing units,
 wherein the memory control circuit unit is further configured to record a first total erase count for the first physical erasing units and record a second total erase count for the second physical erasing units, and
 wherein the memory control circuit unit is further configured to count the first total erase count when at least one of the first physical erasing units is erased and count the second total erase count when at least one of the second physical erasing units is erased.

28. The memory storage device according to claim 26, wherein before the operation of determining whether the first wear value of the first physical erasing units and the second wear value of the second physical erasing units satisfy the relative relation, the memory control circuit unit is further configured to obtain a first maximum total erase count of the first physical erasing units according to the first maximum erase count and the total number of the first physical erasing units,
 wherein the memory control circuit unit is further configured to obtain a second maximum total erase count of the second physical erasing units according to the second maximum erase count and the total number of the second physical erasing units,
 wherein the memory control circuit unit is further configured to obtain a weight value by calculating a ratio between the first maximum total erase count and the second maximum total erase count, and
 wherein the memory control circuit unit is further configured to set a product obtained by multiplying the first total erase count and the weight value as the first wear value and set the second total erase count as the second wear value.

29. The memory storage device according to claim 26, wherein before the operation of determining whether the first wear value of the first physical erasing units and the second wear value of the second physical erasing units satisfy the relative relation, the memory control circuit unit is further configured to obtain a first average erase count corresponding to each of the first physical erasing units according to the first total erase count and the total number of the first physical erasing units, and set the first average erase count as the first wear value,
 wherein the memory control circuit unit is further configured to obtain a second average erase count corresponding to each of the second physical erasing units according to the second total erase count and the total number of the second physical erasing units, and set the second average erase count as the second wear value.

30. The memory storage device according to claim 21, wherein if a memory cell of the physical erasing units is programmed based on the first programming mode, data of a first number of bits is stored into the memory cell, and
 if the memory cell is programmed based on the second programming mode, data of a second number of bits is stored into the memory cell,
 wherein the first number is smaller than the second number.

31. The memory management method according to claim 1, wherein the first physical erasing units plus the second physical erasing units are all the plurality of physical erasing units of the rewritable non-volatile memory module.

32. The memory control circuit unit according to claim 11, wherein the first physical erasing units plus the second physical erasing units are all the plurality of physical blocks of the rewritable non-volatile memory module.

33. The memory storage device according to claim 21, wherein the first physical erasing units plus the second physical erasing units are all the plurality of physical erasing units of the rewritable non-volatile memory module.

* * * * *